April 9, 1929.  H. R. YOUNG  1,708,348

PISTON AND PISTON RING CONSTRUCTION

Filed July 21, 1927

INVENTOR.
Henry R. Young
BY
Stuart C. Barnes
ATTORNEY.

Patented Apr. 9, 1929.

1,708,348

UNITED STATES PATENT OFFICE.

HENRY R. YOUNG, OF MUSKEGON, MICHIGAN.

PISTON AND PISTON-RING CONSTRUCTION.

Application filed July 21, 1927. Serial No. 207,353.

This invention relates to a piston and piston ring construction for machines which employ a piston reciprocating in a cylinder, and it has to do especially with a structure applicable for use in an internal combustion engine.

Piston and piston ring structures of various types have been heretofore proposed for the purpose of effecting a seal between the piston and the cylinder wall to prevent leakage of compressed gases around the piston, and also to prevent oil from passing around the piston by a pumping action which results from piston rings which are loose. Among these proposed structures is an arrangement wherein the ring groove in the piston is supplied with an undercut having a slanting surface, and in cooperation therewith is a compensating or expansion ring with a correspondingly shaped slanting surface. The intended function is that the compensating ring expands against the slanting surface of the piston to keep the sealing ring or rings tight in the groove in the piston.

This construction is objectionable because the provision of the undercut slanting surface in the piston is a very difficult machining operation. For one thing, the machining of the undercut slanting surface must be minutely accurate. If the slanting surface is not extremely accurate, the compensating ring may expand an undue amount. This separates the ends of the ring and allows the gases or the oil to get in behind the ring by passing between the ends. Where the slanting surface in the piston is at an angle which is not abrupt, or more specifically and for example, less than 45° from the horizontal, this objection is especially pronounced. Where the angle is relatively sharp, the objection is not so pronounced, but the compensating ring does not hold the sealing ring or rings so tightly in the groove. The reason being, apparently, that upon the reversal of movement of the piston the inertia of the sealing ring or rings is such as to press against the compensating ring sufficiently to contract it, thus loosening all rings in the groove.

It has also been proposed to provide a ring arrangement which effects a seal by forcing the sealing rings outwardly from the piston and against the cylinder wall with a pressure greater than the normal expanding tendency of the sealing rings. It has been proposed to do this by admitting compressed gases to the rear of the ring or rings for the purpose of forcing them outwardly. This results in too great a pressure against the cylinder wall and causes an undue amount of wear. It has also been proposed to provide an expanding or compensating ring which also contacts with the cylinder wall. This is not a feasible construction because when the compensating ring meets the cylinder wall it can expand no farther and thus its function of keeping the rings tight in the groove ceases; and moreover, the outward expanding pressure of the compensating ring causes too much frictional pressure on the cylinder wall.

The present invention is directed towards the provision of a ring arrangement tightly held in a groove provided therefor in the piston, which at the same time overcomes the above enumerated objections. This is carried out by a ring arrangement wherein the compensating ring is sealed so that when it expands and its ends separate gases can not enter between the ends. The construction permits, in this respect, the use of cooperating slanting surfaces such as to give an efficient wedge action; more specifically, the slanting surfaces can be arranged at a slight angle from the horizontal. Thus the inertia of the rings upon reversal of movement of the piston does not compress the compensating ring and destroy its function. Moreover, the invention contemplates a sealing ring construction which is effected without providing the piston itself with a slanting surface. The arrangement is such that the rings are held tightly in the groove without increasing the pressure against the cylinder wall over that pressure which is provided by the sealing rings themselves.

Figure 1:
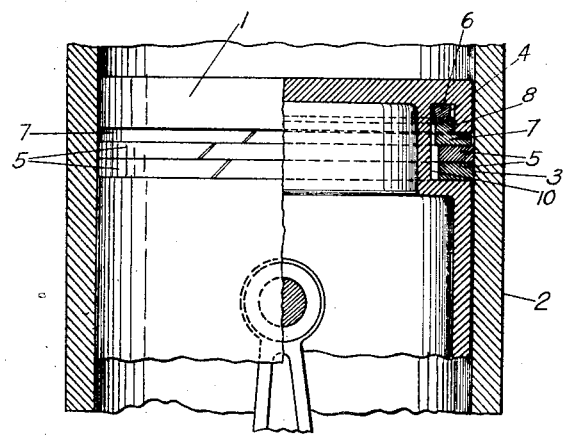
Fig. 1 is a view taken partly in section showing the piston provided with the ring arrangement and also showing a portion of the cylinder wall.

In these drawings a piston 1 is shown, and this piston reciprocates in the cylinder having cylinder walls 2. The piston is provided with a groove 3 for receiving the rings, and this groove is provided with a straight sided undercut, as at 4. By describing the undercut as straight sided it is meant that no slanting surface is provided for the purpose of co-acting with the compensating ring.

In this groove are placed the customary sealing rings 5. As shown, two of such rings are in the groove, as this is a desirable arrangement, although a greater number of rings, or even one ring, can be used. These sealing rings tend to expand outwardly in the normal manner to seal against the wall of the cylinder.

In order to keep the sealing rings tight in the groove a pair of rings 6 and 7 are provided. These two rings are provided with cooperating slanting surfaces. The ring 6 is what may be termed the compensating ring. This ring is disposed within the undercut in the groove and its external diameter, when in operating position is less than the diameter of the outer wall of the undercut thus to permit free outward expansion of the compensating ring. The ring 7 is a sealing ring which bears against the outer walls of the undercut as at 8 so that this ring seals the compensating ring 6 within the undercut.

Figure 2:
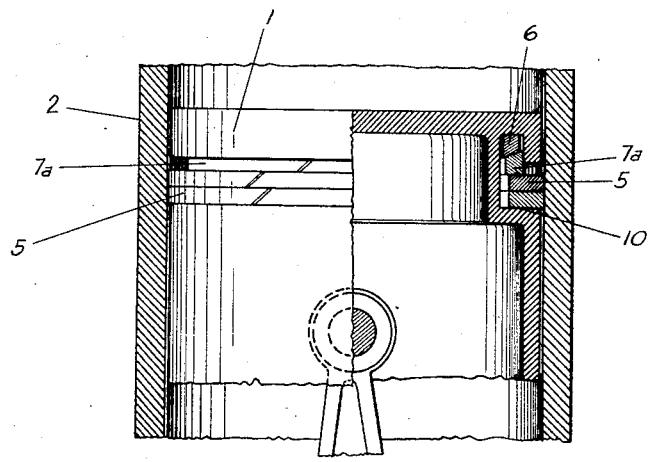
Fig. 2 is a similar view showing a slightly modified form.

The ring 7, as shown in Fig. 1, is generally L-shaped in cross section, and the extreme outer diameter of the ring, in operating position, is less than the diameter of the cylinder. Thus the ring does not contact with the cylinder wall so that it is free to expand and seal against the point 8. In the form shown in Fig. 2 the ring arrangement is the same except that there is a ring 7ª which seals the expanding ring 6. The ring 7ª is not L shaped in cross section, but its outer surface is substantially perpendicular and abuts against the wall of the undercut.

The expansion ring 6, being free to expand in the undercut, forces the sealing rings downwardly and tightly against the shoulder 10. This prevents compressed gases from leaking past the piston by traveling around the rings in the groove because they are sealed against each other and tightly against the seat 10. It prevents a similar passage of oil around the piston. It will be noted that the rings are pressed downwardly and not outwardly whereby frictional pressure against the cylinder walls is not increased.

The provision of the undercut in the groove does not require a difficult machining operation because no surface is provided which cooperates with the compensating ring. Considerable clearance can be left to permit free expansion of the compensating ring 6. Likewise this does not require minute machining operation as slight variation does not affect the function of the compensating ring. The same is true of the slanting surfaces of the two rings 6 and 7. It is not so difficult to machine these two rings with their slanting surfaces as it is to machine a slanting surface in the groove in a piston.

Moreover, these two slanting surfaces can be made on an angle which is not abrupt, or in other words and for example, less than 45° from the horizontal. This gives the compensating ring 6 sufficient leverage upon which to work, which of course, is well understood by those skilled in the art, and at the same time it practically eliminates the possibility of upward pressure by the rings 5 and 7, which results from the inertia of these rings upon reversal of the piston movement, from contracting the compensating ring 6 which would result in loosening in all of the rings in the groove.

I claim:

1. A piston and piston ring construction, comprising a piston having a groove, a substantially square sided shoulder bounding one side of the groove, an undercut portion at the opposite side of the groove, one or more sealing rings in the groove adjacent the shoulder, and a compensating ring in the undercut for keeping the sealing rings tightly against said shoulder, and a ring for sealing the compensating ring in the undercut portion.

2. A piston and piston ring construction, comprising a piston having a groove, a substantially square sided shoulder bounding one side of the groove, an undercut portion at the opposite side of the groove, one or more sealing rings in the groove adjacent the shoulder, and a compensating ring sealed in the undercut portion, said compensating ring being free to expand in the undercut and having a slanting surface, and a ring next adjacent to the compensating ring having a slanting surface which cooperates with the slanting surface of the compensating ring, said last named ring contacting with a wall of the undercut to seal the compensating ring therein.

3. A piston and piston ring construction, comprising a piston having a ring groove, and said ring groove being bounded on one side by a square shoulder and having at the opposite side an undercut substantially rectangular in sectional shape, one or more sealing rings in the groove positioned adjacent the square sided shoulder, and a compensating ring positioned in the undercut portion, said compensating ring being free to expand within the undercut, said compensating ring having a slanting surface, and means cooperating with the slanting surface to hold the sealing rings tightly against the square shoulder upon expansion of the compensating ring.

4. A piston and piston ring construction, comprising a piston having a ring groove, and said ring groove being bounded on one side by a square shoulder and having at the opposite side an undercut, one or more sealing rings in the groove positioned adjacent the square sided shoulder, a compensating ring in the undercut portion and free to expand therein, a ring positioned next adjacent to the compensating ring, this ring and the compensating ring having cooperating slanting surfaces, the said ring adjacent the compensating ring being positioned to seal against the wall of the undercut to seal the compensating ring in the undercut.

5. A piston and piston ring construction, comprising a piston having a groove for sealing rings, the bottom of the groove having a square shoulder, the top of the groove having an undercut, one or more sealing rings near the bottom of the groove, a compensating ring in the undercut portion at the top of the groove, and another ring between the sealing and the compensating rings, this other ring lying partially within the undercut and sealing against a wall thereof.

6. A piston and piston ring construction, comprising a piston having a groove for sealing rings, the bottom of the groove having a square shoulder, and the top of the groove having an undercut, one or more sealing rings near the bottom of the groove, a compensating ring in the undercut portion at the top of the groove, and another ring between the sealing and the compensating rings, this other ring lying partially within the undercut and sealing against the wall thereof, said compensating ring and other ring having cooperating slanting surfaces.

7. A piston and piston ring construction comprising a piston having a groove for sealing rings, one or more sealing rings in the groove, said groove having an undercut portion, a compensating ring in said undercut portion of less external diameter than the undercut portion, and another ring disposed between the sealing ring or rings and the compensating ring, this ring and compensating ring having cooperating slanting surfaces whereby the expanding tendency of the compensating ring keeps the sealing rings tightly in the groove, the said ring between the sealing and compensating rings lying partially within the undercut portion to seal the compensating ring therein.

8. A piston and piston ring construction comprising a piston having a groove for sealing rings, one or more sealing rings in the groove, said groove having an undercut portion, a compensating ring in said undercut portion of less external diameter than the undercut portion, and another ring disposed between the sealing ring or rings and the compensating ring, this ring and compensating ring having cooperating slanting surfaces whereby the expanding tendency of the compensating ring keeps the sealing rings tightly in the groove, the said ring between the sealing and compensating rings being L shaped in cross section with a portion of the ring sealing against the outer wall of the undercut portion, and the extreme outer diameter of this ring being less than the normal diameter of the sealing rings.

In testimony whereof I affix my signature.

HENRY R. YOUNG.